(12) United States Patent
Park (10) Patent No.: US 12,472,043 B2
(45) Date of Patent: Nov. 18, 2025

(54) MATTE REINFORCED ZIRCONIA ABUTMENT ADEQUATE FOR DIGITAL SCANNING AND METHOD FOR MANUFACTURING SAME

(71) Applicant: Tae Seok Park, Seoul (KR)

(72) Inventor: Tae Seok Park, Seoul (KR)

( * ) Notice: Subject to any disclaimer, the term of this patent is extended or adjusted under 35 U.S.C. 154(b) by 324 days.

(21) Appl. No.: 18/012,612

(22) PCT Filed: Dec. 9, 2020

(86) PCT No.: PCT/KR2020/017896
§ 371 (c)(1),
(2) Date: Dec. 22, 2022

(87) PCT Pub. No.: WO2022/010051
PCT Pub. Date: Jan. 13, 2022

(65) Prior Publication Data
US 2023/0248494 A1    Aug. 10, 2023

(30) Foreign Application Priority Data

Jul. 9, 2020 (KR) .................. 10-2020-0084457

(51) Int. Cl.
- A61C 13/08 (2006.01)
- A61C 8/00 (2006.01)
- A61C 13/083 (2006.01)

(52) U.S. Cl.
CPC .......... *A61C 13/082* (2013.01); *A61C 8/0013* (2013.01); *A61C 8/0069* (2013.01); *A61C 13/083* (2013.01)

(58) Field of Classification Search
CPC ......... A61C 13/08; A61C 13/083; A61C 8/00; A61C 8/0013; A61C 8/0069; A61K 6/00
See application file for complete search history.

(56) References Cited

U.S. PATENT DOCUMENTS

| | | | |
|---|---|---|---|
| 6,984,261 B2 * | 1/2006 | Cummings | C04B 35/62655 433/206 |
| 2009/0164027 A1 * | 6/2009 | Zipprich | C25F 3/02 205/261 |
| 2014/0329204 A1 * | 11/2014 | Durbin | A61C 9/0053 433/214 |

FOREIGN PATENT DOCUMENTS

| | | |
|---|---|---|
| JP | 2007-314536 A | 12/2007 |
| KR | 100997553 B1 | 11/2010 |

(Continued)

OTHER PUBLICATIONS

KR101815428 English translation prepared Jan. 24, 2025 (Year: 2025).*

(Continued)

*Primary Examiner* — Alison L Hindenlang
*Assistant Examiner* — Shibin Liang
(74) *Attorney, Agent, or Firm* — NKL Law; Jae Youn Kim (57) ABSTRACT

Provided are a matte reinforced zirconia abutment and a method for manufacturing the same wherein zirconia powder corresponding to the standard colors of a shade guide is used to provide the abutment with a quality similar to a natural tooth, while solving the problem a titanium abutment has had, that is, the difficulties in digital scanning because light is reflected by the gloss of the titanium abutment, and the whole machining method of the abutment is improved to greatly upgrade the durability of the abutment, and the method includes: a main material preparation step; a main material coloring step; a molded body producing step; a primary heat treatment step; a secondary heat treatment step; and a coupling hole formation step.

5 Claims, 3 Drawing Sheets

(56) References Cited

FOREIGN PATENT DOCUMENTS

| KR | 10-1026776 B1 | 4/2011 | |
|---|---|---|---|
| KR | 10-2012-0130882 A | 12/2012 | |
| KR | 10-2017-0112505 A | 4/2016 | |
| KR | 101815428 * | 12/2017 | ............ A61C 13/08 |
| KR | 10-1815428 B1 | 1/2018 | |
| KR | 10-1861103 B1 | 5/2018 | |
| KR | 10-2187414 B1 | 12/2020 | |

OTHER PUBLICATIONS

KR101815428 English translation prepared Mar. 27, 2025 (Year: 2025).*

* cited by examiner

MATTE REINFORCED ZIRCONIA ABUTMENT ADEQUATE FOR DIGITAL SCANNING AND METHOD FOR MANUFACTURING SAME

TECHNICAL FIELD

The present invention relates to an abutment that is a connector between a fixture and a crown, while suggesting an insertion position, height, and angle of the crown, and more specifically, to a matte reinforced zirconia abutment and a method for manufacturing the same wherein zirconia powder corresponding to the standard colors of a shade guide is used to provide the abutment with a quality similar to a natural tooth, while solving the problem a titanium abutment has had, that is, the difficulties in using digital scanning because light is reflected by the gloss of the titanium abutment, and further, the whole machining of the abutment is improved to greatly upgrade the durability of the abutment.

BACKGROUND ART

Generally, an abutment, which is a connecting element in a tooth implant, is vertically coupled to a fixture rooted in the alveolar bone and thus fastened to a crown, thereby preventing bacteria or foreign substances from entering the gum, while the alveolar bone and the fixture are being osseointegrated with each other.

Many studies of the abutment playing an important role in a process of recovering a lost tooth of a patient have been made to improve its functions, and for example, one of the studies is disclosed in Korean Patent Application Laid-open No. 10-2016-0039616 entitled "Dental implant".

According to the above-mentioned conventional technology, a crown is coveredly coupled to a fixture and an abutment to allow the external force applied to the crown to be distributed to the fixture and the abutment, thereby improving the durability of the dental implant, and further, the rotation of the crown is prevented by means of the external force to avoid a screw from being loose, thereby ensuring the stable coupling of the crown.

In the conventional technologies relating to the abutment, further, another example is disclosed in Korean Patent No. 10-0997553 entitled "Integral implant", wherein a fixture and an abutment are made integrally with each other, thereby simplifying a surgical process and reducing surgical time.

Further, a prosthetic extension part extending from the abutment is additionally provided to solve a structural limitation in adjusting a height according to a patient's oral cavity shape under the structure wherein the fixture and the abutment are made integrally with each other.

However, the abutments suggested recently as well as the above-mentioned conventional abutments, which are generally made of titanium with excellent strength against the breakage caused by external force, and in this case, titanium has low biocompatibility so that after surgery, long heating time is needed, and as light is reflected because of the gloss of the titanium itself, there are difficulties in performing digital scanning.

*As a result, there is a definite need for a technology in which a matte zirconia abutment has excellent performance in replacing a lost tooth, provides a color similar to a natural tooth color, and is adequate for digital scanning.

(Patent Literature 1) Korean Patent Application Laid-open No. 10-2016-0039616 entitled "Dental implant"

(Patent Literature 2) Korean Patent No. 10-0997553 entitled "Integral implant"

DISCLOSURE OF THE INVENTION

Technical Problems

Accordingly, the present invention has been made in view of the above-mentioned problems occurring in the related art, and it is an object of the present invention to provide a matte reinforced zirconia abutment that is capable of being made of a biocompatible and matte material, over the existing technology in which the abutment is made of titanium so that as light is reflected because of the gloss of the titanium itself, there are difficulties in performing digital scanning, thereby solving the existing problems, and capable of having excellent strength in consideration of the usability of a replaced tooth to which large load is applied by chewing activities.

Accordingly, it is another object of the present invention to provide a method for manufacturing an abutment that is capable of allowing the abutment to have a color corresponding to a color of a patient's lost tooth, thereby satisfying the patient's need and capable of providing at least one or more colors divided according to standard colors of a shade guide, thereby providing conveniences and rapidness in surgery.

Technical Solutions

To accomplish the above-mentioned objects, a matte reinforced zirconia abutment adequate for digital scanning and a method for manufacturing the same according to the present invention are suggested as follows.

According to the present invention, a method for manufacturing a matte reinforced zirconia abutment adequate for digital scanning may include: a main material preparation step (S10) of pulverizing zirconia into nanoparticles; a main material coloring step (S20) of agitating the main material with a color resin solution made by mixing a compound in which at least one or more chemical substances are mixed and a color tone pigment to thus prepare the main material by color; a molded body producing step (S30) of pouring the main material into a molding device to obtain a molded body; a primary heat treatment step (S40) of performing first calcination for the molded body and then allowing the molded body to be subjected to furnace cooling for 3 to 4 hours; a secondary heat treatment step (S50) of permeatingly melting impregnation glass powder and distilled water into partially sintered portions occurring at the primary heat treatment step to thus make a composite molded body; and a coupling hole formation step (S60) of drilling a coupling hole on top of the composite molded body to insert a fastening bolt for inducing coupling to a fixture.

Further, the chemical substances may be made by mixing at least one or more substances selected from base water, iron(III) nitrate nonahydrate, nickel(II) chloride hexahydrate, sodium silicate, manganese(II) nitrate hexahydrate, chromium(III) nitrate nonahydrate, erbium(III) nitrate pentahydrate, copper(II) nitrate trihydrate, bismuth(III) nitrate pentahydrate, nitric acid 60%, and polyethylene glycol #200.

Further, the base water may be made by mixing mineral water, polyethylene glycol #200 (PEG #200), and nitric acid 60%.

Moreover, the color tone pigment may be made by mixing at least one or more dental ink with black, blue, yellow, orange, red, and green colors to produce classic brushing liquids, classic dipping liquids, and VITA 3D master liquids corresponding to the color codes of a shade guide.

In this case, the coupling hole formation step (S60) may include: a coupling hole drilling step (S61) of drilling the coupling hole with the shape of the counterbore; a dental powder making step (S62) of making dental powder for helping a patient's gum healed; and a dental powder coating step (S63) of applying the dental powder to the inner peripheral surface of the composite molded body to a thickness of 0.05 mm.

Also, the dental powder making step (S62) may include an electrolyzed water acquiring step (S62-1) of supplying direct voltage and current to a mixture of dilute hydrochloric acid and sap produced from the maple tree to cause a catalytic reaction and converting the mixture into electrolyzed water (HOCl); and a dental powder acquiring step (S62-2) of mixing zirconia nanopowder, triamcinolone acetonide, and xylitol powder with the acquired electrolyzed water, drying the mixture, and machining the dried mixture to the form of powder.

Additionally, the dental powder coating step (Step S63) is carried out to apply the dental powder to the inner peripheral surface of the composite molded body in a reverse spiral pattern, correspondingly to the screw thread of the fastening bolt, so that the forced fitting to the fastening bolt is induced to have rigid coupling between the fixture and the crown, and to allow the screw thread of the fastening bolt to cut the dental powder applied to the coupling hole to enable the dental powder to fall to a patient's gum, thereby helping a surgical site healed to greatly reduce the healing time of the surgical site.

Further, the method according to the present invention may include a surface treatment step (S70) of allowing the entire surface of the composite molded body to be post-treated to have a matte surface.

Moreover, at the surface treatment step (S70), roughness may be applied to the surface of the composite molded body by means of sanding treatment to thus provide accuracy in the digital scanning owing to diffused reflection.

Further, at the surface treatment step (S70), an opaque liquid may be applied to the surface of the composite molded body, a heat treatment may be performed for the composite molded body, and the surface of the composite molded body may become matte to provide accuracy in the digital scanning.

In this case, the opaque liquid may make use of a mixture made by mixing 78 to 89% by weight of distilled water, 9 to 18% by weight of a sodium silicate solution, 1 to 2% by weight of ball clay, and 1 to 2% by weight of bentonite.

Advantageous Effectiveness

Under the above-mentioned method of the present invention, the reinforced zirconia abutment is made of the matte zirconia powder to enable various implant placement information using digital scanning to be provided for the patient, so that a degree of accuracy in surgery can be improved to provide a good quality of surgery for the patient.

According to the present invention, as the abutment is made of zirconia, it can provide excellent properties of the zirconia as a dental member in brittleness, fracture toughness, impact resistance, adhesion to the alveolar bone, and biocompatibility, and as the abutment is made according to the standard form of the shade guide by using the color resin solution, moreover, rapid handling in response to the surgical needs of the patient can be provided conveniently for the patient to thus build a pleasant surgical environment.

According to the present invention, besides, over the existing technology in which the abutment is made of titanium because it is impossible that micro machining of the abutment is performed owing to the technical limitations of CAD/CAM, the zirconia is pulverized into nanoparticles and molded by means of the wet CIP, which contributes to the development in the same industrial field.

According to the present invention, also, the dental powder is applied to the coupling hole formed on the abutment to enable the forced fitting to the fastening bolt, thereby inducing the rigid coupling between the fixture and the crown, and as the screw thread of the fastening bolt cuts the dental powder applied to the coupling hole to allow the dental powder to fall to the patient's gum, thereby helping the gum healed to greatly reduce the healing time of the gum.

According to the present invention, in addition, the abutment is made of the biocompatible material, thereby greatly reducing the healing time of the gum after the surgery, and has the color and strength similar to the natural tooth, thereby minimizing the patient's discomfort.

BEST MODE FOR INVENTION

Hereinafter, the configuration, operation, and effectiveness of the present invention will be explained with reference to the attached drawings.

Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. In the description, further, the same reference numerals will be used to describe the same components.

The present invention relates to an abutment that is a connector between a fixture and a crown, while suggesting an insertion position, height, and angle of the crown.

Above all, the present invention relates to a matte reinforced zirconia abutment and a method for manufacturing the same wherein zirconia powder corresponding to the standard colors of a shade guide is used to provide the abutment with a quality similar to a natural tooth, while solving the problem a titanium abutment has had, that is, the difficulties in using digital scanning because light is reflected by the gloss of the titanium abutment, and further, the whole machining of the abutment is improved to greatly upgrade the durability of the abutment.

Figure 1:
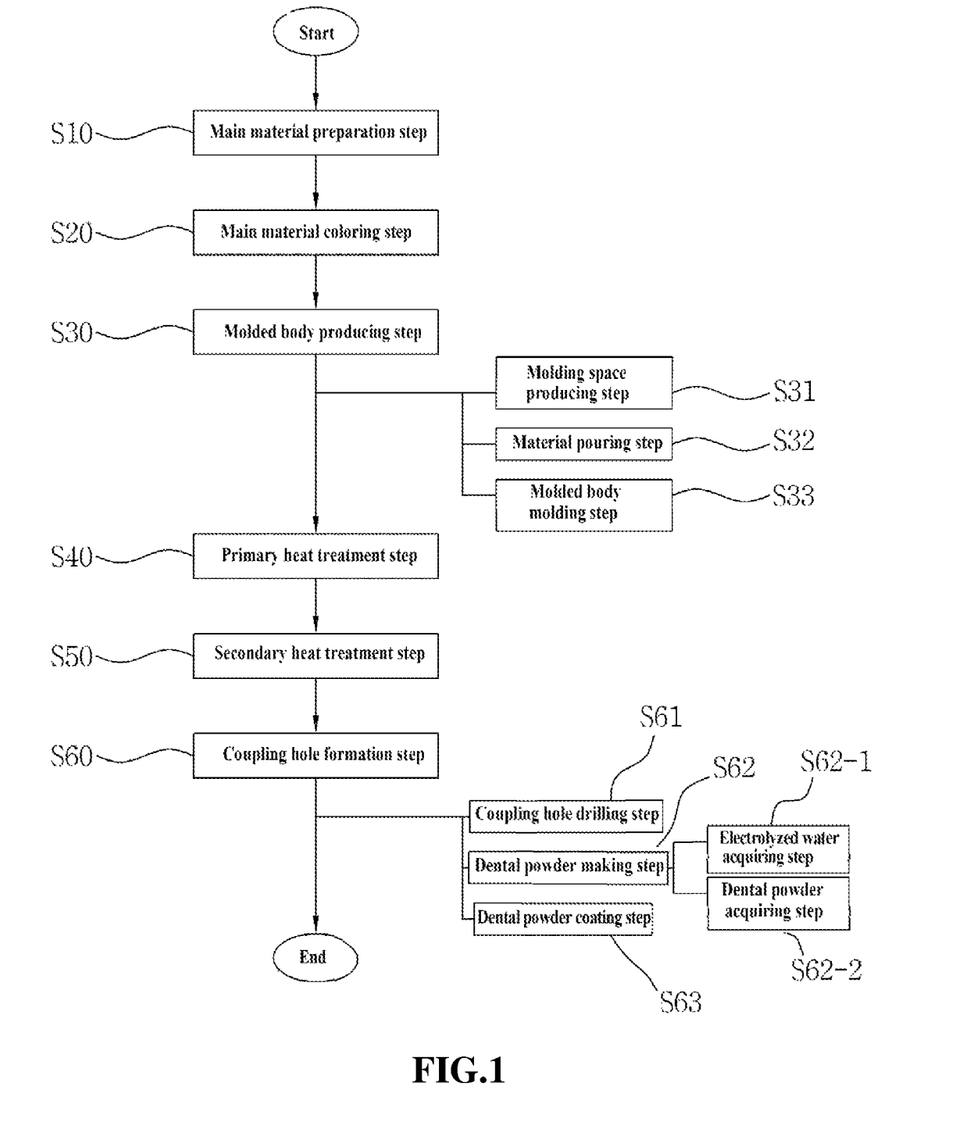
FIG. 1 is a flowchart showing a method for manufacturing a matte reinforced zirconia abutment according to a desirable embodiment of the present invention.

FIG. 1 is a flowchart showing a method for manufacturing a matte reinforced zirconia abutment according to a desirable embodiment of the present invention.

As shown in FIG. 1, a method for manufacturing a matte reinforced zirconia abutment according to the present invention is carried out by pouring zirconia powder into a molding device, molding the zirconia powder to a pre-determined abutment shape, and manufacturing the molded zirconia abutment with repeated heat treatments, and in specific, the method includes: a main material preparation step (S10) of pulverizing zirconia into nanoparticles; a main material coloring step (S20) of agitating the main material with a color resin solution made by mixing a compound in which at least one or more chemical substances are mixed and a color tone pigment to thus prepare the main material by color; a molded body producing step (S30) of pouring the main material into a molding device to obtain a molded body; a primary heat treatment step (S40) of performing first calcination for the molded body and then allowing the molded body to be subjected to furnace cooling for 3 to 4 hours; a secondary heat treatment step (S50) of permeatingly melting impregnation glass powder and distilled water into partially sintered portions occurring at the primary heat treatment step to thus make a composite molded body; and a coupling hole formation step (S60) of drilling a coupling hole on top of the composite molded body to insert a fastening bolt for inducing coupling to a fixture.

The main material preparation step (S10) is carried out by pulverizing zirconia into nanoparticles to improve mechanical and optical characteristics of zirconia. In specific, the zirconia suggested by the present invention makes use of 3 mol % $Y_2O_3$-1.5 mol % $Nb_2O_5$-95.5 mol % $ZrO_2$ with excellent properties in fracture toughness, and the zirconia is subjected to calcination at a temperature of 1050 to 1150° C. for 3 to 4 hours and then pulverized by an attrition mill for 20 to 30 minutes.

Next, alumina, which is pulverized to have average particle sizes in the range of 2.5 to 3.0 μm, is subjected to wet mixing with the zirconia powder for 20 to 24 hours, based on an amount of zirconia added, thereby improving the performance zirconia does not have or the poor performance of zirconia. According to a desirable embodiment of the present invention, for example, 70 to 80% by weight of zirconia powder is mixed with 20 to 30% by weight of alumina powder, which is the most desirable condition in which the performance of alumina is applied, while the performance of zirconia is being not deteriorated at all.

The zirconia has biocompatible performance so that it can greatly reduce the heating time for a patient's gum after surgery, and further, the zirconia has low transmittance so that it can allow better digital scanning when compared with other materials. Moreover, the zirconia has color and strength levels similar to a natural tooth so that after surgery, it can minimize the patient's discomfort in his or her daily life and be thus excellent as a material of an abutment.

Further, the abutment of the present invention is made of only a single material such as zirconia, a metal, or the like, and otherwise, it may be made by mixing at least one or more materials selected from zirconia, metals, and all materials available to make an abutment.

Desirably, a lower region of the abutment, which is coupled to a fixture made of a metal, is made of the metal as the same material with the fixture, and an upper region of the abutment, which is coupled to a crown made of a ceramic, is made of the ceramic, that is, zirconia as the same material with the crown. As the lower region and the upper region of the abutment are made of the same materials as the fixture and the crown, errors in color developments, which are caused by overlapping colors among the crown, the abutment, and the fixture, can be reduced, and further, their coupling force and durability can be improved.

If the fixture made of zirconia is used, of course, the lower region of the abutment is made of zirconia, and if the crown made of a metal is used, the upper region of the abutment is made of the metal.

In addition, the selection of the materials is not limited only to the abutment, and accordingly, the fixture and the crown may be made of a mixture material between the zirconia and the metal.

Comparison and analysis in the performance of zirconia according to compositions of materials are made as follows.

1. Comparison of Performance in Zirconia Machining

Sample 1: A general zirconia block

Sample 2: A block made by allowing 3 mol % $Y_2O_3$-1.5 mol % $Nb_2O_5$-95.5 mol % $ZrO_2$ to be subjected to calcination at a temperature of 1050 to 1150° C. for 3 to 4 hours, pulverizing the zirconia by an attrition mill for 20 to 30 minutes, and pressurizing zirconia powder.

Measurement method: To compare the performance of zirconia according to zirconia machining, an abutment is made by using the properties of the materials, and next, the mechanical properties in coupling to the alveolar bone and the fixture were included in test subjects.

TABLE 1

Performance comparison Table according to machining methods and compositions of materials

| | Compositions | Sample 1 | Sample 2 |
|---|---|---|---|
| Properties of samples | Brittleness | 84.53% | 92.25% |
| | Toughness | 75.68% | 78.69% |
| | Impact resistance | 80.22% | 81.42% |
| | Adhesion | 89.18% | 93.75% |
| | Biocompatibility | 90.53% | 91.44% |
| Mechanical properties of samples | Coupling force | Good | Excellent |
| | Durability | Good | Good |
| | Stability | Good | Excellent |
| | Shrinkage rate | 16 to 19% | 14 to 17% |

<Performance Comparison Table According to Machining Methods and Compositions of Materials>

As the results of the tests, the sample 1 had the properties of brittleness of 84.53%, toughness of 75.68%, impact resistance of 80.22%, adhesion of 89.18%, and biocompatibility of 90.53%, and the sample 2 had the properties of brittleness of 92.25%, toughness of 78.69%, impact resistance of 81.42%, adhesion of 93.75%, and biocompatibility of 91.44%, so that it could be appreciated that all of the properties of the sample 2 were more improved by about 4 to 5% than those of the sample 1, and further, the mechanical properties of the sample 2, such as coupling force, durability, and stability were better than those of the sample 1.

As the measurement results of the shrinkage rates of the sample 1 and the sample 2, moreover, it could be appreciated that the shrinkage rate of the sample 2 was reduced by about 2% when compared to that of the sample 1.

2. Comparison of Strength and Fracture Toughness According to Mixing Amounts of Zirconia and Alumina Test method: Zirconia powder, which was made by allowing 3 mol % $Y_2O_3$-1.5 mol % $Nb_2O_5$-95.5 mol % $ZrO_2$ to be subjected to calcination at a temperature of 1050 to 1150° C. for 3 to 4 hours and pulverizing the zirconia by an attrition mill for 20 to 30 minutes, and alumina powder, which was made by pulverizing alumina to have average particle sizes in the range of 2.5 to 3.0 μm, were varied in amounts and subjected to strength and fracture toughness tests.

Figure 2:
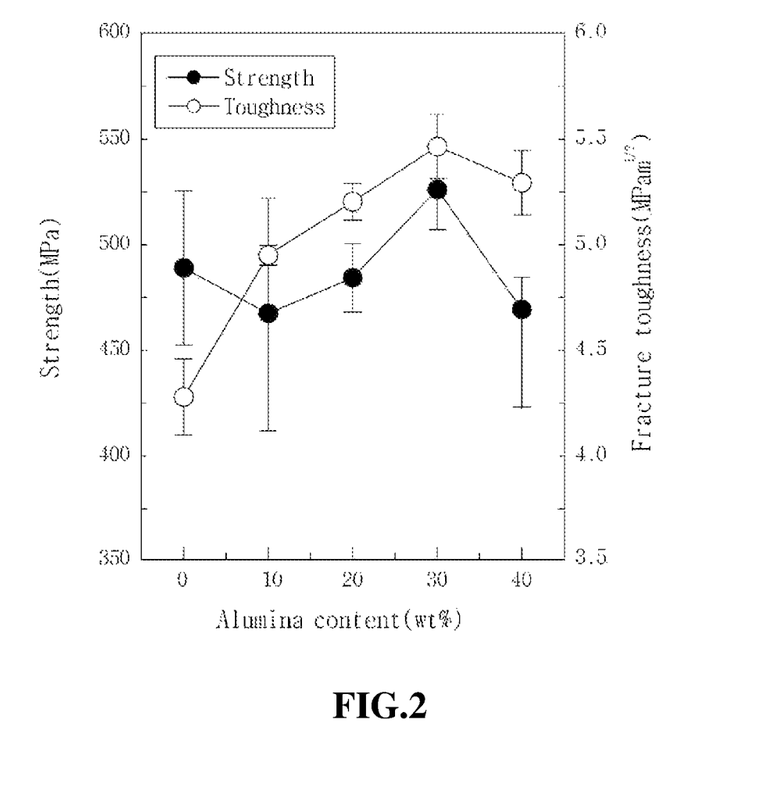
FIG. 2 is a graph showing the strength and fracture toughness for zirconia to which 0 to 40% by weight of alumina was added.

Sample 1: 100% by weight of zirconia powder
Sample 2: 90% by weight of zirconia powder+10% by weight of alumina powder
Sample 3: 80% by weight of zirconia powder+20% by weight of alumina powder
Sample 4: 70% by weight of zirconia powder+30% by weight of alumina powder
Sample 5: 60% by weight of zirconia powder+40% by weight of alumina powder As appreciated from FIG. 2, the strength and fracture toughness for zirconia to which 0 to 40% by weight of alumina was added were measured, and the measured results were reduced to values, and the values were comparedly shown in the graph of FIG. 2. As appreciated even from the graph, the strength values of zirconia were kept at given values in the error range until 40% by weight of alumina was added, but the fracture toughness values of zirconia started to decrease when 40% by weight of alumina was added.

Based on the above-mentioned tests as shown in FIG. 2, it could be found that the strength and the fracture toughness of zirconia were highest when 20 to 30% by weight of alumina was added, and accordingly, the present invention adopted desirable mixing of 70 to 80% by weight of zirconia powder and 20 to 30% by weight of alumina powder in a mixing ratio.

The main material coloring step (S20) is carried out by applying colors corresponding to the standard forms of a shade guide to the main material, and the colors are expressed by mixing a color resin solution suggested in the present invention with the main material made at the main material preparation step (S10).

The color resin solution is made by mixing a compound in which at least one or more chemical substances are mixed and a color tone pigment with each other, and in this case, the chemical substances are listed in Table 3.

TABLE 3

| NO. | Korean Name | English Name | Chemical formula |
| --- | --- | --- | --- |
| 1 | Iron(III) nitrate nonahydrate | Iron(III) nitrate nonahydrate | $(Fe(NO_3)_3 \cdot 9H_2O)$ |
| 2 | Nickel(II) chloride hexahydrate | Nickel(II) chloride hexahydrate | $(NiCl_2 \cdot 6H_2O)$ |
| 3 | Sodium silicate | Sodium silicate | $(Na_2SiO_3)$ |
| 4 | Manganese(II) nitrate hexahydrate | Manganese(II) nitrate hexahydrate | $(Mn(NO_3)_2 \cdot 6H_2O)$ |
| 5 | Chromium(III) nitratenonahydrate | Chromium(III) nitratenonahydrate | $(Cr(NO_3)_3 \cdot 9H_2O)$ |
| 6 | Erbium(III) nitrate pentahydrate | Erbium(III) nitrate pentahydrate | $(ErH_3NO_4)$ |
| 7 | Copper(II) nitrate trihydrate | Copper(II) nitrate trihydrate | $(Cu(NO_3)_2 \cdot 3H_2O)$ |
| 8 | Bismuth(III) nitrate pentahydrate | Bismuth(III) nitrate pentahydrate | $Bi(NO_3)_3 \cdot 5H_2O)$ |
| 9 | Nitric acid 60% | Nitric acid 60% | $HNO_3$ |
| 10 | Polyethylene glycol #200 | Polyethylene glycol #200 | $H(OCH_2CH_2)nOH$ |
| 11 | water | water | $H_2O$ |

<List of Chemical Substances Making Up for a Color Resin Solution>

As appreciated from Table 3, the chemical substances making up for the color resin solution include base water, iron(III) nitrate nonahydrate, nickel(II) chloride hexahydrate, sodium silicate, manganese(II) nitrate hexahydrate, chromium(III) nitrate nonahydrate, erbium(III) nitrate pentahydrate, copper(II) nitrate trihydrate, bismuth(III) nitrate pentahydrate, nitric acid 60%, and polyethylene glycol #200, and at least one or more chemical substances are mixed to produce the compound.

In this case, the base water is made by mixing mineral water, polyethylene glycol #200 (PEG #200), and nitric acid 60%.

The color tone pigment is made by mixing at least one or more dental ink with black, blue, yellow, orange, red, and green colors. According to the present invention, in specific, blank ink made by Hwashin company is used as the black ink, 'op blue 283L' as the blue ink, 'op yellow 984L' as the yellow ink, 'op orange 585L' as the orange ink, 'op red 183L' as the red ink, and 'op green 483L' as the green ink.

The chemical substances and the color tone pigment are mixed under given conditions to produce classic brushing liquids, classic dipping liquids, and VITA 3D master liquids corresponding to the color codes of the shade guide.

An embodiment 1 as will be listed below is a reference table of the classic brushing liquids, an embodiment 2 is a reference table of the classic dipping liquids, and an embodiment 3 is a reference table of the VITA 3D master liquids.

Embodiment 1

| | Base water | Fe | Ni | Mn | Cr | Cu | OP YELLOW 9992L |
| --- | --- | --- | --- | --- | --- | --- | --- |
| A1 | 1000 ml | 7 g | 2.1 g | | | | 0.5 g |
| A2 | 1000 ml | 10 g | 3 g | | | | 0.5 g |
| A3 | 1000 ml | 15 g | 4.5 g | | | | 0.5 g |
| A3.5 | 1000 ml | 17.5 g | 5.3 g | | | | 0.5 g |
| A4 | 1000 ml | 20 g | 6 g | | | | 0.5 g |
| B1 | 1000 ml | 10 g | 1 g | | | | 0.5 g |
| B2 | 1000 ml | 20 g | 2 g | | | | 0.5 g |
| B3 | 1000 ml | 30 g | 3 g | | | | 0.5 g |
| B4 | 1000 ml | 40 g | 4 g | | | | 0.5 g |
| C1 | 1000 ml | 9 g | 2.7 g | 0.2 g | | | 0.5 g |
| C2 | 1000 ml | 13.5 g | 4.1 g | 0.2 g | | | 0.5 g |
| C3 | 1000 ml | 15.8 g | 4.8 g | 0.2 g | 0.8 g | | 0.5 g |
| C4 | 1000 ml | 18 g | 5.4 g | 0.2 g | 0.8 g | | 0.5 g |
| D2 | 1000 ml | 8.4 g | 2.4 g | 0.1 g | 0.4 g | | 0.5 g |
| D3 | 1000 ml | 10 g | 6 g | | | | 0.5 g |
| D4 | 1000 ml | 15.8 g | 4.8 g | | | 0.3 g | 0.5 g |

<Classic Brushing Liquids>

Embodiment 2

| | Base water | Fe | Ni | Mn | Cr | Cu | OP YELLOW 9992L |
| --- | --- | --- | --- | --- | --- | --- | --- |
| A1 | 1100 ml | 7 g | 2.1 g | | | | 0.25 g |
| A2 | 1100 ml | 10 g | 3 g | | | | 0.25 g |
| A3 | 1100 ml | 15 g | 4.5 g | | | | 0.25 g |
| A3.5 | 1100 ml | 17.5 g | 5.3 g | | | | 0.25 g |
| A4 | 1100 ml | 20 g | 6 g | | | | 0.25 g |
| B1 | 1100 ml | 10 g | 2 g | | | | 0.25 g |
| B2 | 1100 ml | 15 g | 3 g | | | | 0.25 g |
| B3 | 1100 ml | 20 g | 4 g | | | | 0.25 g |
| B4 | 1100 ml | 22.5 g | 4.5 g | | | | 0.25 g |
| C1 | 1100 ml | 9 g | 2.7 g | 0.2 g | | | 0.25 g |
| C2 | 1100 ml | 13.5 g | 4.1 g | 0.2 g | | | 0.25 g |
| C3 | 1100 ml | 15.8 g | 4.8 g | 0.2 g | 0.8 g | | 0.25 g |
| C4 | 1100 ml | 18 g | 5.4 g | 0.2 g | 0.8 g | | 0.25 g |
| D2 | 1100 ml | 8.4 g | 2.4 g | 0.1 g | 0.4 g | | 0.25 g |

-continued

| | Base water | Fe | Ni | Mn | Cr | Cu | OP YELLOW 9992L |
|---|---|---|---|---|---|---|---|
| D3 | 1100 ml | 10 g | 6 g | | | | 0.25 g |
| D4 | 1100 ml | 18 g | 5.4 g | | | 0.3 g | 0.25 |

<Classic Dipping Liquids>

Embodiment 3

| | Base water | Fe | Ni | Mn | Cr | Cu | Er | OP Yellow 9992L |
|---|---|---|---|---|---|---|---|---|
| 1M1 | 1100 | 7 | 0.7 | | | | | 0.25 |
| 1M2 | 1100 | 10 | 1 | | | | | 0.25 |
| 2L1.5 | 1100 | 7 | 2.1 | | | | | 0.25 |
| 2L2.5 | 1100 | 14 | 1.4 | | | | | 0.25 |
| 2M1 | 1100 | 4.5 | 1.35 | | | | 0.1 | 0.25 |
| 2M2 | 1100 | 7 | 2.1 | | | | | 0.25 |
| 2M3 | 1100 | 20 | 2 | | | | | 0.25 |
| 2R1.5 | 1100 | 8.1 | 2.43 | | | | 0.18 | 0.25 |
| 2R2.5 | 1100 | 10.5 | 3.15 | | | | | 0.25 |
| 3L1.5 | 1100 | 11.25 | 3.38 | | | | 0.2 | 0.25 |
| 3L2.5 | 1100 | 25 | 2.5 | | | | | 0.25 |
| 3M1 | 1100 | 9 | 2.7 | | | | 0.2 | 0.25 |
| 3M2 | 1100 | 15 | 4.5 | | | | | 0.25 |
| 3M3 | 1100 | 30 | 3 | | | | | 0.25 |
| 3R1.5 | 1100 | 7.14 | 1.89 | | 0.84 | | 0.07 | 0.25 |
| 3R2.5 | 1100 | 17.5 | 5.3 | | | | | 0.25 |
| 4L1.5 | 1100 | 12.65 | 3.71 | | 0.4 | | 0.1 | 0.25 |
| 4L2.5 | 1100 | 24.4 | 2.4 | | 0.4 | | 0.1 | 0.25 |
| 4M1 | 1100 | 9 | 2.7 | | | | 0.2 | 0.25 |
| 4M2 | 1100 | 16.4 | 4.8 | | 0.4 | | 0.1 | 0.25 |
| 4M3 | 1100 | 20 | 6 | | | | | 0.25 |
| 4R1.5 | 1100 | 10.2 | 2.7 | | 1.2 | | 0.2 | 0.25 |
| 4R2.5 | 1100 | 16.15 | 4.77 | | 0.4 | | | 0.25 |
| 5M1 | 1100 | 15.75 | 4.77 | | 0.8 | | 0.2 | 0.25 |
| 5M2 | 1100 | 25 | 7.5 | | | | | 0.25 |
| 5M3 | 1100 | 30 | 9 | | | | | 0.25 |

<VITA 3D Master Liquids>

The color resin solution of the present invention is made with the following recipes, based on the embodiments 1, 2 and 3.

Base water: 1000 ml of mineral water+100 g of PEG #200+2 g of 60% nitric acid

Gray violet: 1000 ml of base water+2 g of Mn+4 g of blank ink made by Hwashin company Blue: 1000 ml of base water+3 g of Cu+0.25 g of op blue 283L Orange yellow: 1000 ml of base water+80 g of Fe+0.5 g of op yellow 984L Brown: 1000 ml of base water+4 g of Fe+4 g of Cr+0.5 g of op orange 585L White: 900 ml of mineral water+100 g of $Na_2SIO_3$+0.5 g of op red 183L White plus: 800 ml of mineral water+200 g of $Na_2SIO_3$+0.5 g of op red 183L Ice blue: 1000 ml of base water+0.25 g of Cr+1.575 g of Cu+0.1 g of op blue 283L Ice gray: 1000 ml of base water+0.07 g of Mn+0.8 g of Fe+0.8 g of Cr+0.6 g of Cu+0.25 g of op green 483L Enamel: 1000 ml of ice gray+1000 ml of ice blue+0.15 g of op green 483L Dark blue: 1000 ml of base water+6 g of Cu+1.2 g of Mn+5 g of Cr+0.5 g of op blue 283L Dark gray: 1000 ml of base water+3.6 g of Cu+2 g of Mn+4 g of Cr+4 g of black ink made by Hwashin company Orange brown: 1000 ml of base water+Fe77+6 g of Cr+0.5 g of op orange 585L Fluorescence: 780 ml of mineral water+20 g of 60% nitric acid_ Bi (wherein Bi is used in a melted state)

Pink: 1000 ml of base water+200 g of Er

Changs Pink: 1000 ml of base water+600 g of Er

The molded body producing step (S30) is carried out by pouring the main material mixed with the color resin solution with the color according to the standard forms of the shade guide into a molding device, pressurizing the main material, and molding the main material to the shape of an abutment.

In this case, the molding device includes all equipment with which the main material is produced to a worker's desired shape, irrespective of pressurization, injection, and the like, and according to the present invention, wet cold isostatic pressing (CIP), which has good precision and keeps excellent performance of zirconia to the maximum, is adopted.

The wet CIP allows the six faces of a material poured into a rubber mold to be pressurized at uniform density and high molding pressure to thus acquire a product having improved precision and durability.

Wet CIP equipment serves to pour powder into the rubber mold, submerge the rubber mold into a liquid in a molding container, and pressurize and mold the rubber mold, and in specific, in the state where the upper and bottom open ends of the mold are closed with covers, the powder poured into the rubber mold is molded to the predetermined shape through isostatic pressing under a molding pressure required by a pressure medium supplied from a pressure port. In this case, a pressurizing axial force is applied from a press frame, and after the pressurizing, the pressure medium is exhausted from the pressure port, so that the pressure of the powder is reduced to an atmospheric pressure, thereby finishing final molding.

*The molded body producing step (S30) includes a molding space producing step (S31) of producing a molding space in which an outer shape of the abutment desired by the worker is made; a material pouring step (S32) of pouring zirconia powder into the molding space; and a molded body molding step (S33) of pressurizing the material against a mold.

The molding space producing step (S31) is carried out by producing the molding space corresponding to the outer shape of the abutment in the mold, and in this case, the mold is made by putting parts in a resin and then hardening them, to prevent occurrence of deterioration or failure caused by moisture or vibration. In this case, casting resin such as polyester is used as the resin. According to the present invention, in specific, an elastic mold made of rubber, silicone, or the like is used as the mold because the elastic mold is strong against temperature, simple in precise molding, and easily detaches the molded product therefrom after molding. For example, the abutment made according to the present invention is a very important element requiring precision in connecting the fixture and the crown, and therefore, it is most desirable that the elastic mold having excellent precise machining is used.

The material pouring step (S32) is carried out by charging the zirconia powder into the molding space formed in the mold, and the molded body molding step (S33) is carried out by adding a stabilizer comprising yttrium(III) oxide ($Y_2O_3$) to the zirconia powder and then pressurizing and molding the zirconia powder to a pressure in the range of 140 to 150 MPa.

The primary heat treatment step (S40) is carried out by performing first calcination for the molded body at the molded body producing step (S30) and then allowing the molded body to be subjected to furnace cooling. In specific, the molded body is put into an electric furnace, heated to a temperature of 1100 to 1120° C. at a heating rate of 9 to 10° C./min, and subjected to the furnace cooling for 2 to 3 hours.

The secondary heat treatment step (S50) is carried out by mixedly applying impregnation glass powder and distilled water to partially sintered portions occurring at the primary heat treatment step, performing secondary calcination to permeatingly melt the glass powder into the molded body, and thus making the composite molded body. In specific, the impregnation glass powder and the distilled water are mixedly applied to the partially sintered portions occurring at the primary heat treatment step, and next, the molded body is heated to a temperature of 1050 to 1100° C. at a heating rate of 25 to 30° C./min and kept for 3 to 4 hours, so that the glass powder is completely permeatingly melted into the molded body, thereby making the composite molded body.

The impregnation glass powder used for making the composite molded body is $La_2O_3$—$Al_2O_3$-$siO_2$ alumina and zirconia infiltration glass and thus mixed according to the composition of 70 to 80% by weight of zirconia powder and 20 to 30% by weight of alumina powder.

In this case, a method for manufacturing the glass is carried out by performing dry mixing of weighed powders by using wear induction, pouring the mixed powders into a platinum melting furnace, and melting the mixed powder therein at a temperature of 1300 to 1400° C. for 1 to 2 hours. Next, the melted liquid is subjected to water cooling, becomes a frit, is pulverized by a disc mill, and made to have 100 meshes.

The properties of the abutment made with a primary heat treatment according to the conventional technology are compared with those of the abutment made with the primary and secondary heat treatments according to the present invention, and the comparison results are listed in Table 4.

Comparison items include brittleness, fracture toughness, impact resistance, adhesion, and biocompatibility limited to the functions of an implant among various properties, and the values by item are calculated with respect to the maximum 100%.

TABLE 4

Comparison Table between properties of general molded body and properties of composite molded body

| Compositions | Brittleness | Fracture toughness | Impact resistance | Adhesion | Biocompatibility |
|---|---|---|---|---|---|
| General molded body | 92.25% | 78.69% | 81.42% | 93.75% | 91.44% |
| Composite molded body | 93.12% | 85.13% | 81.75% | 98.21% | 93.93% |

<Comparison Table Between Properties of General Molded Body and Properties of Composite Molded Body>

As appreciated from Table 4, the general molded body had brittleness of 92.25%, fracture toughness of 78.69%, impact resistance of 81.42%, adhesion of 93.75%, and biocompatibility of 91.44%, thereby satisfying minimal conditions for the implant.

However, the composite molded body made with the primary and secondary heat treatments according to the present invention had brittleness of 93.12%, fracture toughness of 85.13%, impact resistance of 81.75%, adhesion of 98.21%, and biocompatibility of 93.93%, which improved the performance by item by about 3 to 4% when compared with the general molded body, thereby satisfying optimal conditions for the implant.

The coupling hole formation step (S60) is carried out by drilling a circular hole vertically on a center of top of the composite molded body and thus forming a coupling hole with the shape of a counterbore.

The coupling hole formation step (S60) includes: a coupling hole drilling step (S61) of drilling the coupling hole with the shape of the counterbore; a dental powder making step (S62) of making dental powder for helping a patient's gum healed; and a dental powder coating step (S63) of applying the dental powder to the inner peripheral surface of the composite molded body to a thickness of 0.05 mm.

At the coupling hole drilling step (S61), the coupling hole represents a hole for providing a path of a fastening bolt, when the fastening bolt is inserted into the fixture to couple the fixture to the crown after the osseointegration between the patient's alveolar bone and the fixture has been successfully finished, so that the fastening bolt passes through the abutment from the crown and reaches the fixture.

Further, the coupling hole of the present invention has the shape of the counterbore, and the counterbore includes a through hole for passing a screw portion of the fastening bolt therethrough and a concave hole with a diameter corresponding to the head of the fastening bolt on the concentric circle of the through hole, so that the head of the fastening bolt is completely inserted into the interior of a machined material, thereby protecting the fastening bolt from different external forces and giving excellent visual appearance.

The coupling hole having the shape of the counterbore provides a stable and rigid coupling force and does not expose the fastening bolt to the outside to prevent the interference with the crown from occurring.

The dental powder making step (S62) is carried out by making a material coated on the inner peripheral surface of the coupling hole to express roughness, and as mentioned above, the dental powder makes the inner peripheral surface of the coupling hole rough to induce forced fitting of the fastening bolt to the coupling hole, so that the coupling force between the abutment and the fixture can be improved. While the fastening bolt is being inserted into the coupling hole, further, the screw thread of the fastening bolt cuts some of the dental powder coated on the coupling hole to make the cut dental powder fall to the patient's gum, so that the dental powder helps a surgical site healed to reduce the healing time.

The dental powder making step (S62) includes an electrolyzed water acquiring step (S62-1) of supplying direct voltage and current to a mixture of dilute hydrochloric acid and sap produced from the maple tree to cause a catalytic reaction and converting the mixture into electrolyzed water (HOCl); and a dental powder acquiring step (S62-2) of mixing zirconia nanopowder, triamcinolone acetonide, and xylitol powder with the acquired electrolyzed water, drying the mixture, and machining the dried mixture to the form of powder.

At the electrolyzed water acquiring step (S62-1), the dilute hydrochloric acid is used as a sterilizing or disinfecting agent in medical centers such as hospitals, and the like because of excellent disinfection effectiveness, and the sap produced from the maple tree serves to apply an electrolyzation force for accelerating electrolysis to the dilute hydrochloric acid.

The sap produced from the maple tree is abundant in potassium, magnesium, calcium, and various minerals to accelerate the healing of the gum, and further, the sap serves to neutralize the acid of the dilute hydrochloric acid to a level applicable to the patient's oral cavity and to greatly improve the electrolyzation force by the addition of a given amount of salt thereto.

At the dental powder acquiring step (S62-2), the zirconia nanopowder serves to accelerate the osseointegration between the fixture and the alveolar bone because of its biocompatible ingredients, while entering a gap in a screw-coupled portion between the fastening bolt and the fixture and being attached uniformly to the gap to provide more rigid coupling force.

At the dental powder acquiring step (S62-2), the triamcinolone acetonide, which is one of treating agents for stomatitis, serves to accelerate the osseointegration between the fixture and the alveolar bone, together with the zirconia nanopowder, and thus heal the incised gum for surgery of the fixture rapidly.

At the dental powder acquiring step (S62-2), the xylitol powder serves to block the invasion of bacteria in the process where the osseointegration between the fixture and the alveolar bone is made, in particular, to suppress the acidic ingredients of the dilute hydrochloric acid contained in the electrolyzed water.

Hereinafter, comparison in healing time after an abutment coated with natural dental powder and a general abutment have been applied to patients is carried out to prove the performance and effectiveness of the dental powder suggested in the present invention.

Embodiment 4

Test method: Among 20 test subjects who need implant surgery, 10 test subjects had the implant surgery using the sample 1, and the remaining 10 test subjects had the implant surgery using the sample 2. The states of the gums of the patients were monitored at intervals of 5 days for two months after the surgery has been finished, and then, the monitored results were calculated into values as shown by the graph of Table 4.
Sample 1: General abutment
Sample 2: Abutment coated with dental powder In FIG. 3, a symbol 'x' represents the sample 1 as the general abutment with no dental powder, and a symbol '●' represents the sample 2 as the abutment with dental powder.

Figure 3:
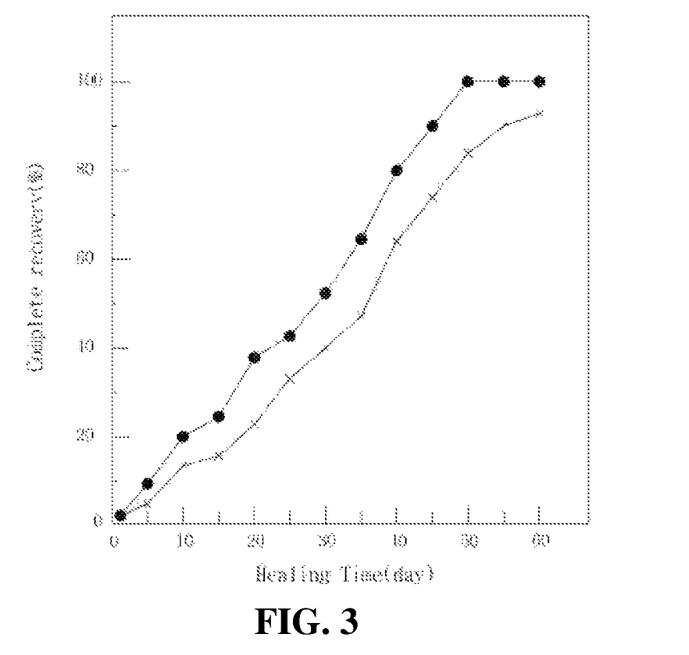
FIG. 3 is a graph showing recovery rates of the test subjects having the implant surgery using the general abutment with no dental powder (represented by a symbol 'x') and using the abutment with dental power (represented by a symbol '●').

As expected, the results showed that the 10 test subjects having the implant surgery using the sample 2 with the dental powder had better recovery rates than the 10 test subjects having the implant surgery using the sample 1 with no dental powder, and some of the 10 test subjects having the implant surgery using the sample 2 were completely recovered before two months.

However, the 10 test subjects having the implant surgery using the sample 1 were not completely healed even after two months, and some of the 10 test subjects having the implant surgery using the sample 1 had consistent pain even during the test.

As a result, it could be found that the abutment with the dental powder reacted with the patient's alveolar bone to reduce the heating time and improve the health state of the surgical site.

The dental powder coating step (S63) is carried out by applying the dental powder to the inner peripheral surface of the composite molded body to provide surface roughness having various shapes, and according to the present invention, in specific, the dental powder is applied in a reverse spiral pattern, correspondingly to the screw thread of the fastening bolt.

The dental powder, which is applied in the reverse spiral pattern, correspondingly to the screw thread of the fastening bolt, crosses the screw thread of the fastening bolt whose fastening is finished, and as the screw thread of the fastening bolt and the spiral pattern of the dental powder interlock with each other, a pressurizing force is generated to allow a firm coupling force to be obtained through the forced fitting between the fastening bolt and the abutment.

When the screw thread of the fastening bolt is insertedly fastened, further, it crosses the spiral pattern of the dental powder and enters to allow the amount of dental powder falling to the patient's gum to increase in proportion with the amount of spiral pattern cut, thereby inducing the reduction of the healing time.

Further, the method according to the embodiment of the present invention includes a surface treatment step (S70) of allowing the entire surface of the composite molded body to be post-treated to have a matte surface, and the surface treatment step is selected from sanding treatment and opaque liquid application.

The sanding treatment is carried out by performing sanding for the surface of the composite molded body by using aluminium oxide ($Al_2O_3$) with the size of 50 μm to a pressure of 4 bar, spraying a steam cleaner onto the composite molded body, and removing impurities from the composite molded body. After the process, roughness is applied to the surface of the composite molded body to allow a physical coupling force with the crown to be improved, and as diffused reflection is generated, further, gloss is removed from the surface of the composite molded body to allow 3D digital scanning to be easily performed because of the matte surface.

The opaque liquid application is carried out by applying an opaque liquid to the surface of the composite molded body, performing a heat treatment for the composite molded body, and making the composite molded body matte. In this case, the opaque liquid makes use of a mixture made by mixing 78 to 89% by weight of distilled water, 9 to 18% by weight of a sodium silicate solution, 1 to 2% by weight of ball clay, and 1 to 2% by weight of bentonite. In the process, diffused reflection is generated from the surface of the composite molded body by means of the opaque liquid, so that gloss is removed from the surface of the composite molded body to allow 3D digital scanning to be easily performed because of the matte surface.

Under the above-mentioned method according to the present invention, the reinforced zirconia abutment is made of the matte zirconia material to enable various implant placement information using digital scanning to be provided, so that a degree of accuracy in surgery can be improved to provide a good quality of surgery for the patient. As the abutment is made of zirconia, further, it can provide excellent properties of the zirconia as a dental member in brittleness, fracture toughness, impact resistance, adhesion to the alveolar bone, and biocompatibility, and as the abutment is made according to the standard form of the shade guide by using the color resin solution, moreover, rapid handling in response to the surgical needs of the patient can be provided conveniently for the patient to thus build a pleasant surgical environment.

According to the present invention, besides, over the existing technology in which the abutment is made of titanium because it is impossible that micro machining of the abutment is performed owing to the technical limitations of CAD/CAM, the zirconia is pulverized into nanoparticles and molded by means of the wet CIP, which contributes to the development in the same industrial field. Also, the dental powder is applied to the coupling hole formed on the abutment to enable the forced fitting to the fastening bolt, thereby inducing the rigid coupling between the fixture and the crown, and as the screw thread of the fastening bolt cuts the dental powder applied to the coupling hole, the dental powder falls to the patient's gum, thereby helping the gum healed to greatly reduce the healing time of the gum.

According to the present invention, in addition, the abutment is made of the biocompatible material, thereby greatly reducing the healing time of the gum after the surgery, and has the color and strength similar to the natural tooth, thereby minimizing the patient's discomfort.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

EXPLANATIONS OF REFERENCE NUMERALS

S10. Main material preparation step S20. Main material coloring step
S30. Molded body producing step S31. Molding space producing step
S32. Material pouring step S33. Molded body molding step
S40. Primary heat treatment step S50. Secondary heat treatment step
S60. Coupling hole formation step S70. Surface treatment step
S61. Coupling hole drilling step S62. Dental powder making step
S63. Dental powder coating step

The invention claimed is:

1. A method for manufacturing a matte reinforced zirconia abutment configured for digital scanning, the method comprising:
   a main material preparation step (S10) of pulverizing zirconia into nanoparticles;
   a main material coloring step (S20) of agitating the main material with a color resin solution made by mixing a compound in which at least one or more chemical substances are mixed and a color tone pigment to thus prepare the main material by color;
   a molded body producing step (S30) of pouring the main material into a molding device to obtain a molded body;
   a primary heat treatment step (S40) of performing first calcination for the molded body and then allowing the molded body to be subjected to furnace cooling for 3 to 4 hours;
   a secondary heat treatment step (S50) of permeatingly melting impregnation glass powder and distilled water into partially sintered portions occurring at the primary heat treatment step to thus make a composite molded body; and
   a coupling hole formation step (S60) of drilling a coupling hole on top of the composite molded body to insert a fastening bolt for inducing coupling to a fixture,
   wherein the chemical substances are made by mixing base water with at least one or more substances selected from iron (III) nitrate nonahydrate, nickel (II) chloride hexahydrate, sodium silicate, manganese (II) nitrate hexahydrate, chromium (III) nitrate nonahydrate, erbium (III) nitrate pentahydrate, copper (II) nitrate trihydrate, bismuth (III) nitrate pentahydrate, nitric acid 60%, and polyethylene glycol #200, and the base water is made by mixing 1000 ml of mineral water, 100 g of polyethylene glycol #200 (PEG #200), and 2 g of nitric acid 60%.

2. The method according to claim 1, wherein the color tone pigment is made by mixing at least one or more dental ink with black, blue, yellow, orange, red, and green colors to produce classic brushing liquids, classic dipping liquids, and VITA 3D master liquids corresponding to the color codes of a shade guide.

3. The method according to claim 1, further comprising a surface treatment step (S70) of allowing the entire surface of the composite molded body to be post-treated to have a matte surface.

4. The method according to claim 3, wherein at the surface treatment step (S70), roughness is applied to the surface of the composite molded body by means of sanding treatment to provide accuracy in the digital scanning owing to diffused reflection.

5. The method according to claim 3, wherein at the surface treatment step (S70), an opaque liquid is applied to the surface of the composite molded body, a heat treatment is performed for the composite molded body, and the surface of the composite molded body becomes matte to thus provide accuracy in the digital scanning.

* * * * *